Figure 1:
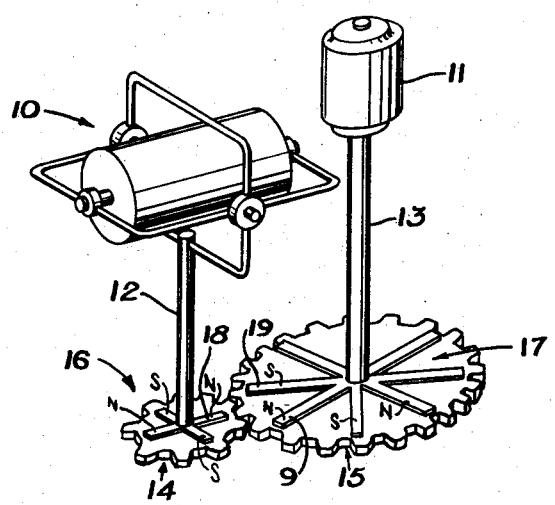

July 7, 1959    F. E. SCHULTE    2,893,257
MAGNETIC BACKLASH ELIMINATOR
Filed March 1, 1956

INVENTOR.
FREDRICK E. SCHULTE
BY
*Moody & Habecker*
ATTORNEYS

2,893,257
MAGNETIC BACKLASH ELIMINATOR

Fredrick E. Schulte, Cedar Rapids, Iowa, assignor to Collins Radio Company, Cedar Rapids, Iowa, a corporation of Iowa Application March 1, 1956, Serial No. 568,801

5 Claims. (Cl. 74—409)

This invention relates to linkage or gears connected together and more particularly to magnetic ways for reducing backlash between adjacent parts in mechanical linkages.

Prior methods of removing backlash from gears has almost universally been some way of spring loading split gears such that the split gears put pressure on both sides of the teeth of the mating gears. Similarly, in rod linkages spring loading means have been used to avoid backlash in the motion which the rods connect. The disadvantage of these spring loading techniques has been that no matter what materials are used or how carefully the gears or linkages are lubricated, there is still an undue amount of both friction and dynamic resistance to motion.

In the gyroscope art backlash and friction both are critical. Repetition at a different ratio of the gyro position, or merely motion coupling, is often needed without the error caused by the backlash or the precession of the gyro caused by the resistance to motion (friction) shown by spring loaded types of coupling.

It is accordingly an object of this invention to provide devices having a reduced amount of backlash.

It is a further object of this invention to provide mechanical coupling means with as low a friction as possible, considering the materials involved.

It is a feature of this invention that permanent magnets or permanently magnetized articles of magnetic materials may be used to provide a simplified backlash reducing means.

It is a further feature of the invention that additional parts need not be used to practice this invention where the materials involved in the mechanical coupling are capable of being permanently magnetized.

Figure 2:
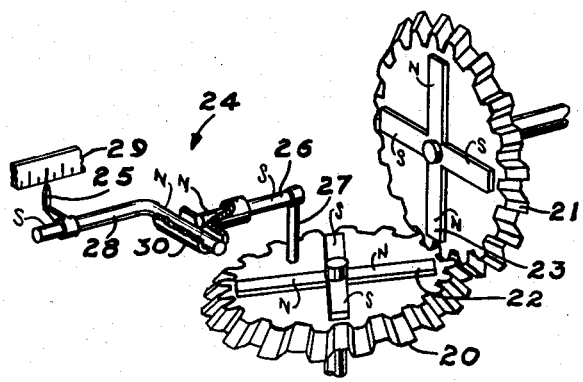

Further objects, features, and advantages of the invention will become apparent from the following description and claims when read in conjunction with the drawing, in which:

Figure 1 shows a gyroscope and a synchro coupled by gears having a ratio of two to one utilizing the invention with permanent magnets, and Figure 2 shows application of the invention to an indicator linkage with a bevel gear drive.

Figure 1 shows a gyroscope 10, drawn schematically, and a synchro 11. The rotary output motion of the gyroscope is found at shaft 12. The rotary input motion of the synchro is at shaft 13. Coupling the gyro and the synchro are a pair of gears 14 and 15. As can readily be seen, the gear ratio between 14 and 15 is two to one. Mounted on gears 14 and 15 is a series of permanent magnets 16 and 17, respectively. These magnets are shown in a spider form, of radiating spokes, but may be simply single bars with the alternating polarity at the circumference of the gears as shown in Figure 1. The north pole of one gear magnet is positioned intermediately to the north and south poles of the opposing gear magnet.

It will be readily discerned that the forces of the magnetic fields of the magnets on the two gears cause gearing 14 to run on one side of each of the teeth of gear 15. The two north poles 9 and 18 repel, and the north and south poles, 18 and 19, respectively, attract. Since the magnetic polarity alternates around the circumference on each gear, the same repulsion and attraction forces occur throughout a revolution of the gear. As a result, as the gears rotate, the forces of the magnetic fields of the magnets also rotate and continue to mesh in the same relationship as above described causing a continuing force against the same respective side of the gear teeth to be applied throughout each rotation of the gearing. Backlash for forces transmitted by the gears less than the magnetic field forces is virtually eliminated.

Since the forces exerted are on one side of each gear tooth only, the friction of the gear loading types of backlash devices is lessened considerably. The semi-jamming resulting from high spring pressures on both sides of the gear teeth is also eliminated. Of course, it is desirable that the invention be applied to integer ratios of gearing such as one to one, two to one, three to one, etc., to maintain the same position precision throughout infinite revolutions of the gears. If near integer gear ratios are used, some loading is available at all times, although, as like poles pass each other during revolution of the gearing, there is a hiatus or loss of precision when the anti-backlash force transfers the loading from one side of the gear tooth to the other side.

Magnetizing each gear tooth alternately north and south in order going around the circumference of the gear, in accord with the invention, also results in elimination of backlash. When both meshing gears having a repeated tooth meshing, as 10 : 32, there would be no loss of position precision as there would be with a dissimilar meshing, as 41 : 10, where the above-noted hiatus occurs periodically.

Of course, however way the magnetic field is established, the gears must not be meshed too tightly, but only substantially, or less than solid back and front bearing for each tooth, to avoid a "jamming" effect.

Figure 2 shows the invention applied to bevel gears 20 and 21 drawn here as having a one to one gear ratio but which may be of any integer gear ratio. It is to be noted that the two north poles 22 and 23 are more closely adjacent than in Figure 1. There is, as a result, more variation in the magnitude of anti-backlash magnetic force during rotation, but the device still has the desired anti-backlash forces.

Connected to gear 20 is an indicating linkage 24 useable with gyro applications where a precise indication of the pointer 25 is required, especially where the indicator must have a joint in the linkage. Rod 26 is connected to gear 20 by a pin 27. Coupled to rod 26 is another rod 28. Rod 28 carries pointer 25, which is shown adjacent a scale 29. Joining rods 26 and 28 is a saddle 30 of non-magnetic metal.

Rods 26 and 28 are of a magnetic metal such as iron. The adjacent ends of 26 and 28 are magnetized so as to have like poles. The saddle or coupling 30 is of non-magnetic metal so as to prevent a shunting of the magnetic field adjacent the ends of rods 26 and 28. Rod 26 is held fixed in coupling 30 while rod 28 is in a hole larger than the rod itself. As with the gearing, the adjacent like poles repel and therefore create an anti-backlash force maintaining rod 28 against the saddle 30. As long as the force transmitted from 26 to 28 is less than the magnetic repulsion, the contact with coupling 30 determines the length of the linkage with the result of no backlash.

Although this invention has been described with respect to particular embodiments thereof, it is not to be so limited because changes and modifications may be made therein which are within the full intended scope of the invention as defined by the appended claims.

I claim:
1. Anti-backlash means for meshed gears comprising a first gear, a second gear, said first and second gears having an integral tooth ratio and means producing a magnetic field of alternating polarity circumferentially on each gear, poles of said magnetic means on said first gear being positioned differently along the circumference from like poles of said magnetic means on said second gear.
2. Backlash reducing means for meshed gears made of magnetic material comprising a first gear, a second gear, said first and second gears meshing and having an integral tooth ratio, portions of each of said gears being magnetized at their circumference, said magnetized portions being of alternating polarity around said gears.
3. Backlash reducing means for meshed gears comprising magnetic means fastened to said gears providing alternate polarity magnetic fields at the circumference of each gear, the fields of one gear meshing with the fields of the other gear.
4. Gear backlash reduction means for meshed gears having an integral tooth ratio comprising magnetized spiders having radially extending poles adjacent the circumferences of the said gears, said poles having the same integral ratio as the gear teeth on which said magnet is mounted.
5. Backlash reducing means for meshed gears having an integral ratio of teeth comprising a series of radially extending permanent magnets, the circumferential ends of each magnet having alternate magnetic polarities around said circumference and the magnetic field of the magnets on one gear meshing with the magnetic field of the magnets on the other gear.

References Cited in the file of this patent

UNITED STATES PATENTS

| | | |
|---|---|---|
| 2,167,641 | Dewan | Aug. 1, 1939 |
| 2,207,683 | Lemmon | July 9, 1940 |
| 2,243,555 | Faus | May 27, 1941 |
| 2,365,520 | Bogue | Dec. 19, 1944 |
| 2,510,675 | Baruch | June 6, 1950 |
| 2,537,083 | Peoples | Jan. 9, 1951 |
| 2,613,246 | Spodig | Oct. 7, 1952 |
| 2,663,198 | Cairnes | Dec. 22, 1953 |
| 2,722,617 | Cluwen | Nov. 1, 1955 |

FOREIGN PATENTS

| | | |
|---|---|---|
| 479,784 | France | May 10, 1916 |
| 591,285 | Great Britain | Aug. 13, 1947 |
| 623,173 | Great Britain | May 12, 1949 |
| 860,087 | Germany | Dec. 18, 1952 |